Jan. 2, 1945. J. H. KOHLER 2,366,629
SEAL
Filed March 23, 1943
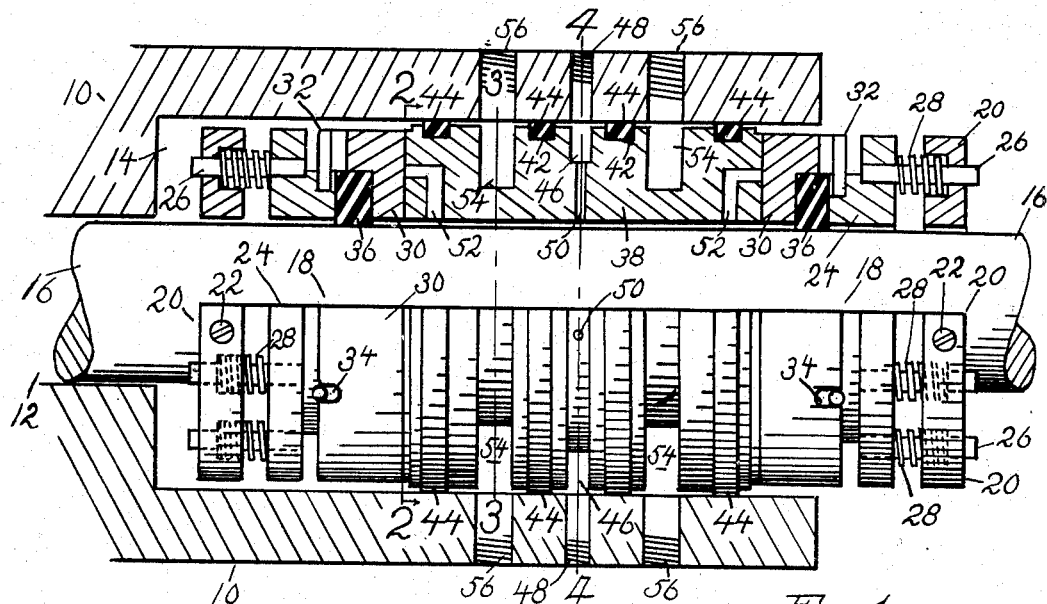
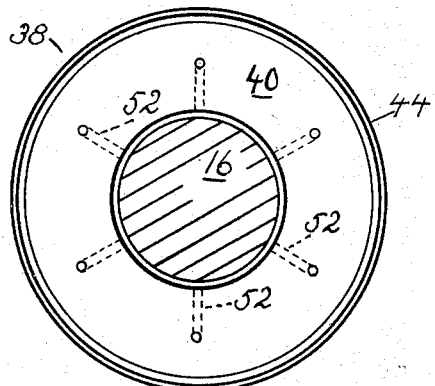
Fig. 2
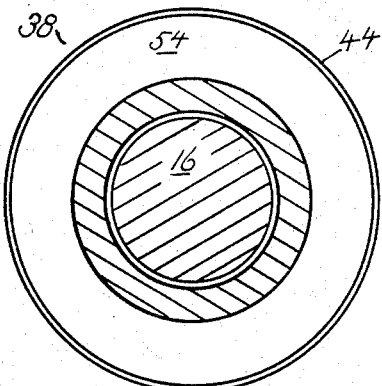
Fig. 3
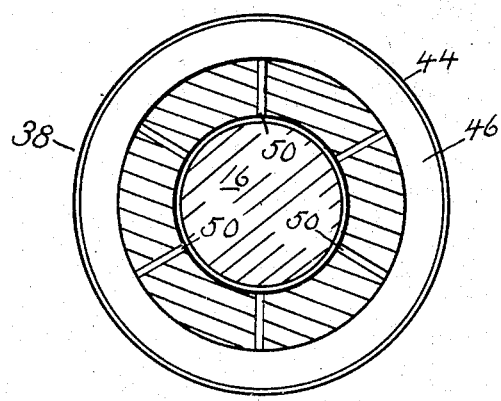
Fig. 4
JOSEPH H. KOHLER
INVENTOR.
BY Leon T. Hooper
ATTORNEY.

Patented Jan. 2, 1945

2,366,629

UNITED STATES PATENT OFFICE 2,366,629

SEAL

Joseph H. Kohler, Calumet City, Ill.; Mercantile Bank, administrator of said Joseph H. Kohler, deceased, assignor of two-thirds to Gladys Kohler and one-third to Cullie R. Kohler, both of Hammond, Ind.

Application March 23, 1943, Serial No. 480,134

3 Claims. (Cl. 286—7)

This invention relates to an improved seal which incorporates an internal flange and is especially adapted for employment in centrifugal pumps, valves, and the like. The improved device may be employed where limited clearance prevents the use of an external flange.

One of the chief objects of importance and advantage of the improved device of this invention resides in the provision of means for incorporating it in a sealing unit without bolting or otherwise securing it to the shaft housing.

Another and further object of importance is the provision of supplying the device with a circulating coolant and lubricating system. Additionally the flow of coolant may be independently controlled to favor either end of the improved device.

Still another object of advantage and importance resides in the provision of means for employing the improved device on pumps and the like without first making changes and alterations in the bearing or stuffing boxes thereof.

An additional object of advantage and importance is the provision of means employing the improved device in relatively short packing or stuffing boxes. Furthermore the device may be readily removed for replacement or repairs.

The improved seal of this invention may incorporate sealing elements of the kind set forth and claimed in my Patents Nos. 2,112,461, dated March 21, 1938, and 2,220,965, dated Nov. 12, 1940. The device may also be used in conjunction with other sealing units.

Additional objects of advantage and importance will become apparent as the following detailed description progresses, reference being had to the accompanying drawing, wherein Fig. 1 is an elevational view of a rotatable shaft sealing unit having an internal gland, parts thereof being broken away, which embodies the invention.

Fig. 2 is a vertical section taken on line 2—2 of Fig. 1 and shows a sealing face of the internal flange.

Fig. 3 is a vertical section taken on line 3—3 of Fig. 1.

Fig. 4 is a vertical section taken on line 4—4 of Fig. 1.

As shown in the drawing:

The reference numeral 10 indicates generally a portion of a bearing housing. Formed in the housing 10 is an aperture 12 which includes an enlarged portion or stuffing box 14.

Rotatably journaled in the aperture 12 of the housing 14 is a shaft 16. The shaft 16 extends beyond each end of the aperture 12 as is clearly shown in the drawing.

Operably positioned on the shaft 16 is a pair of sealing elements 18. The sealing elements each include an annular locking element 20 which is preferably secured to the shaft by means of set screws 22. The locking elements 20 may be moved longitudinally of the shaft 16 for adjustment.

Slidably positioned on the shaft 16 is a sleeve member 24. The sleeve member 24 is operably connected to the annular locking element 20 by means of guide pins 26 and tension springs 28. The tension on the springs may be varied by adjustment of the locking element 20.

Positioned on the shaft 16 and adapted to rotate therewith is a sealing element 30. The sealing element 30 is operably connected to the sleeve member 24 by means of pins 32 engageable in slots 34.

Positioned on the shaft 16 intermediate the sealing element 30 and the sleeve member 24 is a resilient packing 36. The packing 36 is in liquid tight association with the shaft 16. Additionally pressure exerted by the springs 28 on the sleeve member 24 forms a liquid tight joint between that member, the packing 36 and the sealing element 30.

Loosely positioned on the shaft 16 within the stuffing box 14 is a non-rotatable internal gland 38. The gland 38 is interposed between the two sealing elements 18 as is best shown in Fig. 1. Each end of the internal gland 38 is faced to provide a sealing surface 40. The sealing surfaces are adapted to operate in liquid tight association with the sealing surfaces of the sealing elements 30.

Formed in the peripheral surface of the internal gland is a plurality of packing element receiving grooves 42. A packing element 44 is positioned in each groove 42. The packing elements 44 are in liquid tight association with the interior surface of the stuffing box 14. Additionally the engagement of the packing elements 44 with the surface of the stuffing box prevents the gland 38 from rotating with the shaft 12.

Formed in the central peripheral surface of the internal gland 38 is an annular oil groove 46. The groove 46 may be connected to a supply and discharge line by means of threaded passageways 48 as are best shown in Fig. 1.

Extending radially inwardly from the bottom of the oil groove 46 is a plurality of passageways 50, 50. The passageways 50 provide means for conveying a lubricant from the groove to the shaft 16.

Extending radially outwardly from the bore of the gland 38 near each end thereof and thence horizontally to the sealing faces is a plurality of passageways 52, 52. The passageways 52, 52 provide a means for conducting a lubricant from the bore of the gland 38 to the sealing faces 40 thereof. The lubricant may also pass through the gap between the shaft 16 and the bore of the gland to the sealing surfaces 40 of the glands 38.

Formed in the circumferential surface of the gland 38 intermediate the oil groove and each end is an annular coolant groove 54. The coolant grooves may be connected to supply and discharge lines by means of the threaded passageways 56, 56 through the housing 10.

The coolant grooves 54 are of sufficient depth and close enough to the sealing surfaces 40 of the gland 38 to quickly dissipate heat generated between the rotatable and the non-rotatable parts. Additionally the sealing faces are lubricated at the shaft and also at a midway point. The lubricating and cooling features incorporated herein produce an exceptionally efficient and long wearing seal.

It will be apparent from the foregoing that herein is provided an efficient, durable and simple device which may be incorporated in both high and low pressure centrifugal pumps or the like. Additionally the tension on both sealing surfaces may be adjusted through the setting of one locking element 20.

It will also be apparent to those skilled in the art to which the improved device of this invention appertains that numerous changes in design and construction may be made, all without departing from the spirit and scope of the invention. Accordingly, the patent granted hereon is not to be limited to the precise embodiment here shown or in any other way except as is necessitated by the terminology of the appended claims when given the range of equivalents to which they may be entitled.

I claim as my invention:

1. In a sealing unit for a rotatable shaft, a casing through which said shaft extends, a pair of sealing elements secured to said shaft and rotatable therewith, an internal gland positioned on said shaft intermediate said pair of sealing elements, said internal gland being secured against rotation, each end of said gland being provided with a sealing face which face is in liquid tight engagement with one of said pair of sealing elements, means for conveying a lubricant from the exterior of said casing to said sealing faces, means for directing a coolant onto said internal gland, and means for urging said sealing elements toward each other and against the sealing faces of said internal gland.

2. In a shaft seal, a cylindrical apertured gland, a plurality of annular packing receiving grooves in the peripheral surface of said gland, said grooves being positioned at regularly spaced intervals, a packing ring positioned in each groove, said packing rings being adapted to engage the surface of a stuffing box in which the device is positioned to provide a plurality of independent passageways completely surrounding said gland, an annular coolant groove formed in the surface of said gland intermediate each outermost pair of packing rings, an oil groove formed in the surface of said gland intermediate the innermost pair of packing rings, a plurality of oil passageways extending radially inwardly from the bottom of said oil groove to said aperture, and a plurality of oil passageways extending radially outwardly from the aperture to the sealing surfaces of said gland.

3. In a shaft seal, a stuffing box through which a shaft extends, an apertured gland having a sealing surface on each end thereof positioned within said stuffing box, a plurality of packing rings interposed between said gland and the wall of said stuffing box to form a plurality of liquid-tight passageways therearound, certain of said passageways being utilized for a coolant, one of said passageways being utilized for a lubricant, lubricant passageways extending from said first named lubricant passageway to the sealing surfaces of said gland, and a sealing element positioned on said shaft and against each sealing surface of said gland to provide liquid-tight joints, said sealing elements being in liquid-tight association with said shaft and rotatable therewith.

JOSEPH H. KOHLER.